(12) United States Patent  
Carcioffi

(10) Patent No.: US 7,264,304 B2
(45) Date of Patent: Sep. 4, 2007

(54) VEHICLE BODY

(75) Inventor: Carlo Carcioffi, Maranello (IT)

(73) Assignee: Ferrari S.p.A., Via Emilia Est (IT)

( * ) Notice: Subject to any disclaimer, the term of this patent is extended or adjusted under 35 U.S.C. 154(b) by 231 days.

(21) Appl. No.: 10/492,773

(22) PCT Filed: Oct. 15, 2002

(86) PCT No.: PCT/IT02/00659

§ 371 (c)(1),
(2), (4) Date: Jan. 14, 2005

(87) PCT Pub. No.: WO03/033332

PCT Pub. Date: Apr. 24, 2003

(65) Prior Publication Data

US 2005/0116505 A1    Jun. 2, 2005

(30) Foreign Application Priority Data

Oct. 16, 2001 (IT) .......................... TO2001A0979

(51) Int. Cl.
B62D 21/15 (2006.01)

(52) U.S. Cl. .................... 296/193.04; 296/187.03; 296/187.09; 296/187.11; 296/205; 296/203.02; 296/203.04; 180/312

(58) Field of Classification Search ........... 296/187.03, 296/187.09, 187.11, 193.04, 193.08, 193.09, 296/203.01, 204, 205, 203.02, 203.04; 180/31, 180/312, 311
See application file for complete search history.

(56) References Cited

U.S. PATENT DOCUMENTS

| | | | | |
|---|---|---|---|---|
| 4,533,172 A * | 8/1985 | Oliver | ................... | 296/203.01 |
| 5,666,727 A * | 9/1997 | Rashid | ................... | 296/205 |
| 5,882,064 A * | 3/1999 | Emmons | ................ | 296/193.04 |
| 6,695,392 B2 * | 2/2004 | Stoffels et al. | ........ | 296/187.09 |
| 6,896,319 B1 * | 5/2005 | Huang et al. | .......... | 296/193.04 |
| 2003/0168887 A1 * | 9/2003 | Stoffels et al. | ........ | 296/193.09 |
| 2003/0173134 A1 * | 9/2003 | Unfried et al. | ............ | 180/312 |
| 2005/0116503 A1 * | 6/2005 | Hartelt et al. | ........... | 296/181.2 |

* cited by examiner

Primary Examiner—Jason Morrow
(74) Attorney, Agent, or Firm—John A. Artz; Dickinson Wright PLLC

(57) ABSTRACT

A vehicle body (1) having a central cell (2) made of composite materials; a front auxiliary frame (3) anchored to the front end of the central cell (2); and a rear auxiliary frame (4) anchored to the rear end of the central cell (2); the front auxiliary frame (3) and the rear auxiliary frame (4) dissipated by the vehicle in the event of collision, without directly involving the central cell (2).

9 Claims, 3 Drawing Sheets

VEHICLE BODY

This application claims priority from patent application Serial No. TO2001A000979 filed on Oct. 16, 2001 (16.10.01) in Italy under the Patent Cooperation Treaty.

TECHNICAL FIELD

The present invention relates to a vehicle body.

More specifically, the present invention relates to a high-performance, central-engine vehicle body, to which the following description refers purely by way of example.

BACKGROUND ART

As is known, high-performance, central-engine vehicle bodies normally comprise a supporting structure made of composite material and only involving the front and central part of the vehicle where the passenger compartment is formed; and the engine block which projects from the rear end of the supporting structure.

The front suspensions and all the other front and central component parts of the vehicle, including the body panels, are variously fixed to the composite material supporting structure, while the rear suspensions, transmission, rear differential, and all the other rear component parts of the vehicle, including the body panels, are fixed directly to the engine block, which in turn is fixed rigidly to the composite-material supporting structure by means of bolts or similar.

Though ensuring a high degree of rigidity and passenger safety, bodies of the above type have the major drawback of being practically impossible to repair in the event of collision. That is, the mechanical stress produced on impact is transmitted directly to the composite-material supporting structure, which is extremely rigid and lightweight, but also only deformable at the expense of being irreparably impaired structurally.

In the event of impact, in fact, the composite-material supporting structure collapses and disintegrates irreparably, so that, to repair the vehicle, the entire supporting structure must be replaced at exorbitant cost.

Another drawback of the above solution is that the engine block must be fixable firmly to the composite-material supporting structure, and must have a torsional and flexural rigidity comparable with that of the supporting structure, thus greatly increasing manufacturing cost as compared with a conventional engine block, which on average is also lighter than a structural engine block.

DISCLOSURE OF THE INVENTION

It is an object of the present invention to provide a vehicle body designed to eliminate the aforementioned drawbacks.

According to the present invention, there is provided a vehicle body, characterized by comprising a rigid central cell made of composite materials; a front auxiliary frame anchored to the front end of said central cell; and a rear auxiliary frame anchored to the rear end of the central cell; the front auxiliary frame and the rear auxiliary frame being so deformable as to absorb, in the form of mechanical strain, the energy dissipated by the vehicle in the event of collision, without directly involving the central cell.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
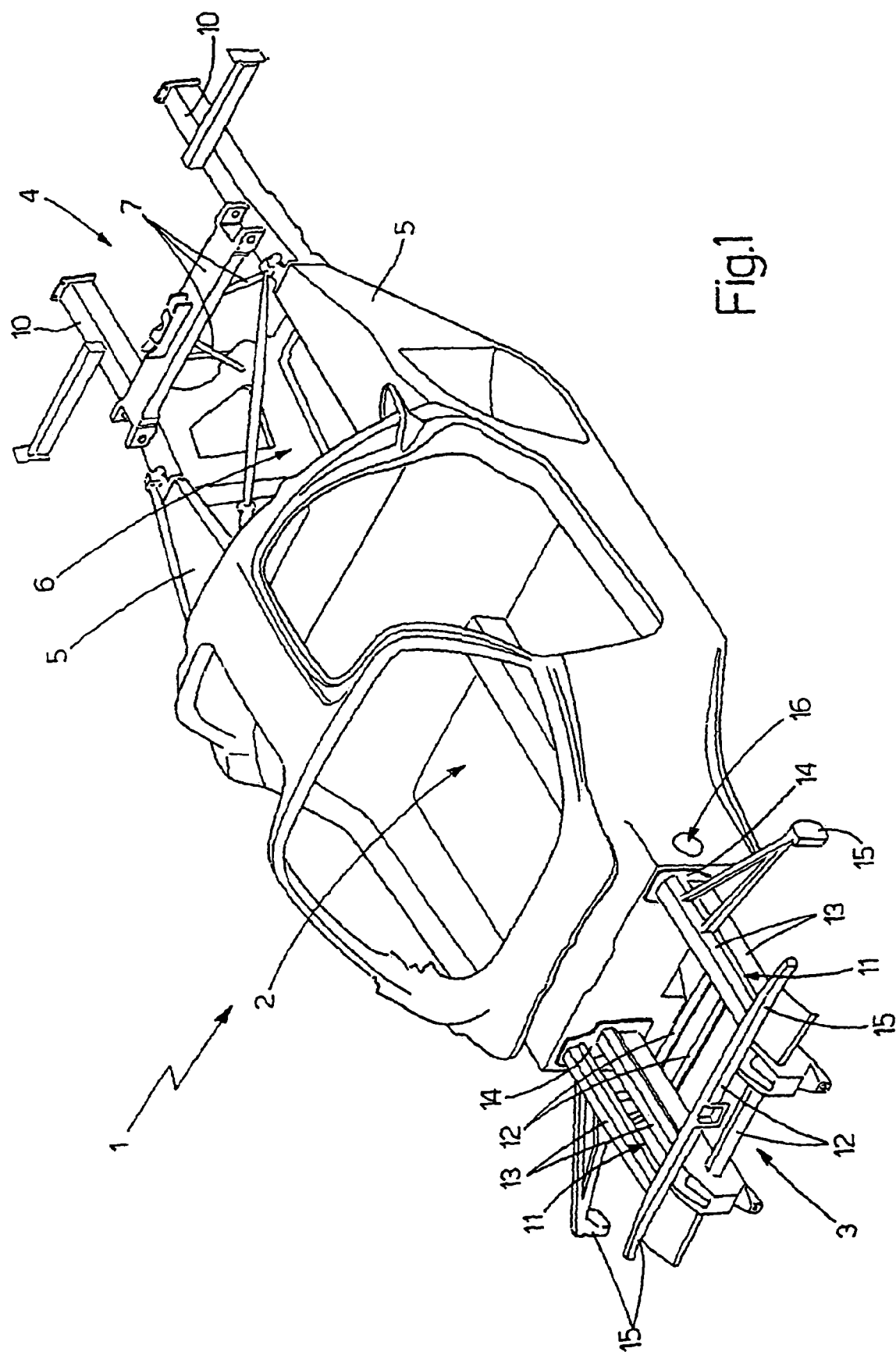
FIG. 1 shows a view in perspective, with parts removed for clarity, of a vehicle body in accordance with the teachings of the present invention.
Figure 2:
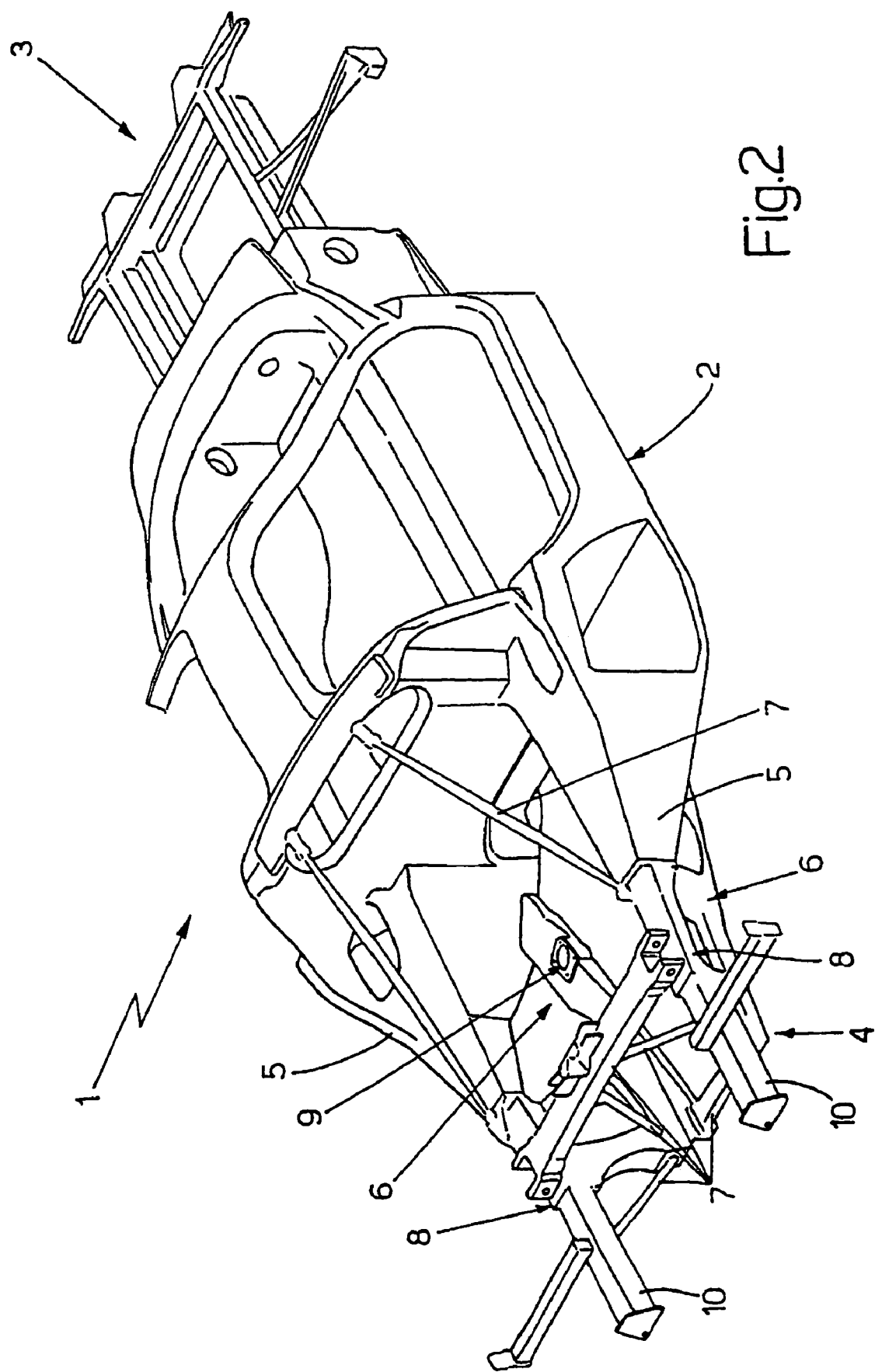
FIG. 2 shows a view in perspective of the FIG. 1 body from a different angle.

Number 1 in FIGS. 1 and 2 indicates as a whole a vehicle body particularly suitable for high-performance, central- or rear-engine vehicles.

Body 1 comprises a strong, rigid central cell 2 made of composite materials; a deformable front auxiliary frame 3 anchored to the front end of central cell 2; and a deformable rear auxiliary frame 4 anchored to the rear end of central cell 2.

Central cell 2 is designed to form the rigid, undeformable structure of the passenger compartment of the vehicle, while front auxiliary frame 3 and rear auxiliary frame 4 are made at least partly of metal (e.g. aluminum) so as to absorb, in the form of mechanical strain, the energy dissipated by the vehicle in the event of collision, without directly involving central cell 2.

More specifically, front auxiliary frame 3 and rear auxiliary frame 4 are made at least partly of metal, so as to absorb all the energy dissipated by the vehicle in the event of medium-low impact, and to entrust passenger safety to central cell 2 in the event of medium-high impact, in which case, passenger safety takes precedence over preventing damage to the vehicle.

Front auxiliary frame 3 and rear auxiliary frame 4 may also provide for supporting the vehicle suspensions; the vehicle engine and auxiliary components, such as the coolant radiator; vehicle transmission members, such as the transmission case and/or differential; and the body panels.

In the example shown, central cell 2 is preferably, though not necessarily, made of carbon fiber, and at the rear has two parallel, facing longitudinal members 5 projecting horizontally from the main body of central cell 2, on opposite sides of the vertical centerline plane of the vehicle.

Figure 3:
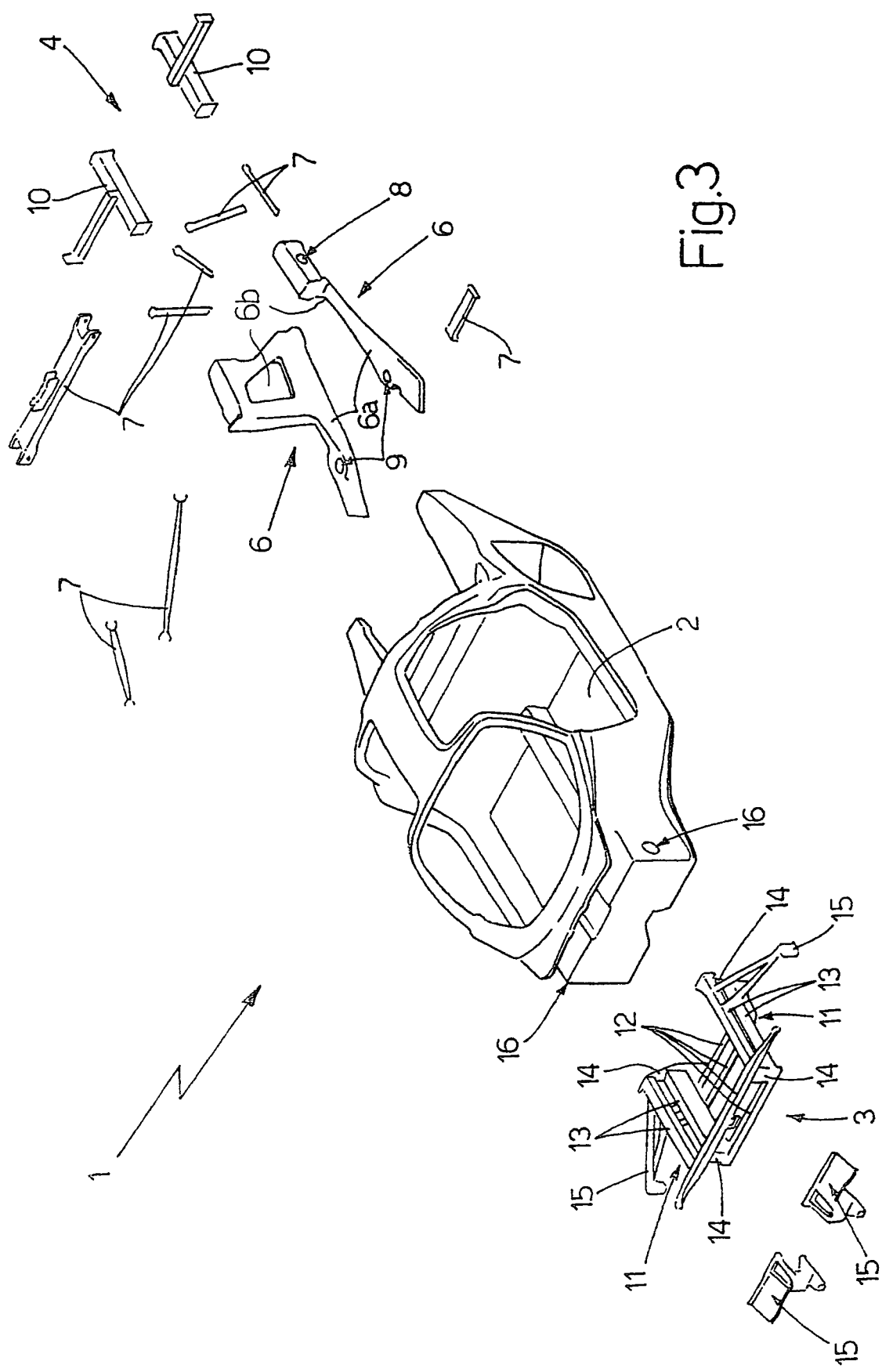
FIG. 3 shows an exploded view of the vehicle body in the previous figures.

With reference to FIGS. 2 and 3, rear auxiliary frame 4 is fixed to the distal ends of the two longitudinal member 5 by means of bolts or similar fastening systems, and, in the example shown, comprises two supporting beams 6 fixed to the rear end of central cell 2, on opposite sides of the vertical centerline plane of the vehicle, and each just beneath a corresponding longitudinal member 5 of central cell 2; and a number of horizontal transverse stiffening members 7 made of metal and connecting the two supporting beams 6.

Each of the two supporting beams 6 comprises two segments 6a and 6b arranged in the form of an L, and is fixed at a first end to central cell 2, end to the head of corresponding longitudinal member 5, so that segment 6a of each of the two supporting beams 6 is positioned horizontally just beneath the corresponding longitudinal member 5.

More specifically, in the example shown, segments 6a of the two supporting beams 6 are located on opposite sides of the vertical centerline plane of the vehicle, and converge away from central cell 2; and segments 6b of the two supporting beams 6 slope outwards so as define, with horizontal transverse stiffening members 7, a trapezoidal structure lying in a plane perpendicular to the vertical centerline plane of the vehicle.

It should be pointed out that the two supporting beams 6 are monolithic, may be made indifferently of composite material or metal, such as aluminum, and are so formed as to comprise both the attachment points 8 for the rear vehicle suspensions on segments 6b, and the attachment points 9 for the engine supporting joints on segments 6a.

If made of metal, the two supporting beams 6 may be cat using cores of sand or similar filler material.

In addition, rear auxiliary frame 4 comprises two projecting supporting bars 10 extending parallel to and facing each other on opposite sides of the vertical centerline plane of the vehicle. Each of the two projecting bars 10 is preferably, though not necessarily, made of aluminum, and is fixed to the end of a corresponding supporting beam 6 to define an extension of a corresponding longitudinal member 5 of central cell 2.

With reference to FIGS. 1 and 3, front auxiliary frame 3 if fixed to the front end of central cell 2 by bolts or similar fastening systems, and, in the example shown, comprises two horizontal supporting beams 11 fixed to the front end of central cell 2, on opposite sides of the vertical centerline plane of the vehicle; and a number of horizontal transverse stiffening members 12 connecting the ends and the central portions of the two supporting beams 11.

In the example shown, each of the two supporting beams 11 comprises two box members 13 made of aluminum and fixed rigidly to each other by two connecting plates 14 welded to both ends of both box members 13, and which are fixed to central cell 2 by bolts or similar fastening systems.

Preferably, though not necessarily, front auxiliary frame 3 has a number of supporting brackets 15 projecting from the two supporting beams 11 and from horizontal transverse stiffening members 12 to support, together with the two supporting beams 11 and with horizontal transverse stiffening members 12, the body panels and all the other front component parts of the vehicle, except for the front suspensions, the attachment points 16 of which are formed on the sides of central cell 2.

As stated, the rear suspension attachment points 8 are formed on the two supporting beams 6 of rear auxiliary frame 4.

Operation of body 1 is easily deducible from the foregoing description, with no further explanation required.

The advantages of body 1 as described and illustrated herein are obvious: in the event of medium-low impact, front auxiliary frame 3 and rear auxiliary frame 4 provide for absorbing mechanical stress before it reaches central cell 2 of composite material, thus preventing damage to the cell and drastically reducing repair cost.

Both front auxiliary frame 3 and rear auxiliary frame 4 can be cast in one piece using cores of sand or similar filler material, which provides for obtaining extremely rigid, lightweight structures.

Relieving the engine block of any structural function greatly simplifies the engine structure, thus greatly reducing weight.

Clearly, changes may be made to the vehicle body 1 as described and illustrated herein without, however, departing from the scope of the present invention.

What is claimed is:

1. A vehicle comprising:
    a vehicle engine;
    a front suspension;
    a rear suspension;
    a plurality of body panels; and
    a vehicle body comprising:
        a rigid central cell (2) having a front end and a rear end, said rigid central cell (2) comprised of composite materials;
        a front auxiliary frame (3) anchored to said front end of said rigid central cell (2); and
        a rear auxiliary frame (4) anchored to said rear end of said rigid central cell (2);
        said front auxiliary frame (3) comprising two front supporting beams (11) fixed to said front end of said rigid central cell (2), on opposite sides of a vertical centerline plane of the vehicle, and a plurality of front horizontal transverse stiffening members (12) connecting said two front supporting beams (11);
        said two front supporting beams (11) comprising two box members (13) fixed rigidly to each other by two connecting plates (14) welded to said two box members (13);
        wherein said front auxiliary frame (3) and said rear auxiliary frame (4) being so deformable as to absorb, in the form of mechanical strain, the energy dissipated by said vehicle body in the event of collision, without directly involving said central cell (2).

2. A vehicle as described in claim 1, wherein:
    said vehicle engine is supported by said rear auxiliary frame (4), and
    said rear auxiliary frame (4) comprises:
    a plurality of rear suspension attachment points (8) for affixing said rear suspension to said vehicle body.

3. A vehicle as described in claim 1, wherein said rear auxiliary frame (4) comprises:
    two rear supporting beams (6) located on opposite sides of a vertical centerline plane of said vehicle body; and
    a plurality of rear horizontal transverse stiffening members (7) connecting said two rear supporting beams (6), each of said two rear supporting beams (6) including both rear suspension attachment points (8) for attaching said rear suspension to said vehicle body, and engine supporting joint attachment points (9) for attaching said vehicle engine to said vehicle body.

4. A vehicle as described in claim 3, wherein said two rear supporting beams (6) are each formed in one piece from metal or composite material.

5. A vehicle as described in claim 1, wherein said central cell (2) comprises:
    two longitudinal members (5) projecting from said rear end of a main body of said rigid central cell (2), said two longitudinal members (5) positioned on opposite sides of a vertical centerline plane of the vehicle, said rear auxiliary frame (4) fixed to said two longitudinal members (5).

6. A vehicle as described in claim 1, wherein said central cell (2) comprises:
    a plurality of front suspension attachment points (16) for affixing said front suspension to said vehicle body.

7. A vehicle as described in claim 1, wherein said rear auxiliary frame (4) comprises a plurality of rear suspension attachment points (8) for affixing said rear suspension to said vehicle body.

8. A vehicle as described in claim 1, wherein said body panels are affixed to said vehicle body by way of attachment to said front auxiliary frame (3) and said rear auxiliary frame (4).

9. A vehicle as described in claim 3, wherein said two rear supporting beams (6) and said plurality of rear horizontal transverse stiffening members (7) form a trapezoidal structure lying perpendicular to a vertical centerline plane of said vehicle body.

\* \* \* \* \*

UNITED STATES PATENT AND TRADEMARK OFFICE
CERTIFICATE OF CORRECTION

PATENT NO. : 7,264,304 B2  Page 1 of 1
APPLICATION NO. : 10/492773
DATED : September 4, 2007
INVENTOR(S) : Carlo Carcioffi It is certified that error appears in the above-identified patent and that said Letters Patent is hereby corrected as shown below:

On the title page, item [57]:
The Abstract should read:

-- A vehicle body (1) having a central cell (2) made of composite materials; a front auxiliary frame (3) anchored to the front end of the central cell (2); and a rear auxiliary frame (4) anchored to the rear end of the central cell (2); the front auxiliary frame (3) and the rear auxiliary frame (4) being so deformable as to absorb, in the form of mechanical strain, the energy dissipated by the vehicle in the event of collision, without directly involving the central cell (2). --

Column 2, line 50: "member" should read -- members --

Column 2, line 60: "central cell 2, end" should read -- central cell 2, close to the base of the corresponding longitudinal member 5, and at a second end --

Column 3, line 11 "cat" should read -- cast --

Signed and Sealed this

Thirty-first Day of August, 2010

David J. Kappos
*Director of the United States Patent and Trademark Office*